(12) United States Patent
Ono et al.

(10) Patent No.: US 10,668,903 B2
(45) Date of Patent: Jun. 2, 2020

(54) VEHICLE BODY BEHAVIOR CONTROL DEVICE AND METHOD OF CONTROLLING BEHAVIOR OF VEHICLE BODY

(71) Applicant: Robert Bosch GmbH, Stuttgart (DE)

(72) Inventors: Shunsaku Ono, Kanagawa (JP); Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 241 days.

(21) Appl. No.: 15/735,392

(22) PCT Filed: Jun. 2, 2016

(86) PCT No.: PCT/IB2016/053235
§ 371 (c)(1),
(2) Date: Dec. 11, 2017

(87) PCT Pub. No.: WO2017/037549
PCT Pub. Date: Mar. 9, 2017

(65) Prior Publication Data
US 2018/0178768 A1    Jun. 28, 2018

(30) Foreign Application Priority Data

Jun. 16, 2015 (JP) ................................. 2015-120768

(51) Int. Cl.
*B60T 8/17* (2006.01)
*B60T 8/1755* (2006.01)
(Continued)

(52) U.S. Cl.
CPC ............ *B60T 8/1706* (2013.01); *B60T 8/171* (2013.01); *B60T 8/172* (2013.01); *B60T 8/1755* (2013.01);
(Continued)

(58) Field of Classification Search
CPC ......... B60T 8/1706; B60T 8/171; B60T 8/172
See application file for complete search history.

(56) References Cited

U.S. PATENT DOCUMENTS

| | | | |
|---|---|---|---|
| 2009/0055068 A1* | 2/2009 | Osaki ..................... | B60K 28/16 701/87 |
| 2016/0039423 A1* | 2/2016 | Makita .................. | B60W 30/19 192/219 |

FOREIGN PATENT DOCUMENTS

| CN | 101622163 A | 1/2010 |
|---|---|---|
| CN | 103381817 A | 11/2013 |

(Continued)

OTHER PUBLICATIONS

International Search Report for Application No. PCT/IB2016/053235 dated Aug. 18, 2016 (English Translation, 3 pages).

*Primary Examiner* — Michael D Lang
(74) *Attorney, Agent, or Firm* — Michael Best & Friedrich LLP (57) ABSTRACT

Provided are a vehicle body behavior control device which can reduce unstable behavior of a vehicle body and a method of controlling behavior of a vehicle body which can reduce unstable behavior of the vehicle body. A vehicle body behavior control device incorporated into a vehicle body having a plurality of wheels includes: a behavior control mechanism which controls behavior of the vehicle body; and a control part which controls an operation of the behavior control mechanism based on an axle load applied to the wheel calculated using a gradient value θ of a road surface.

17 Claims, 5 Drawing Sheets

(51) Int. Cl.
    *B60T 8/171*     (2006.01)
    *B60T 8/172*     (2006.01)
    *B60T 8/18*     (2006.01)
    *B60T 8/24*     (2006.01)
    *B60T 8/26*     (2006.01)

(52) U.S. Cl.
    CPC .............. *B60T 8/185* (2013.01); *B60T 8/245* (2013.01); *B60T 8/261* (2013.01); *B60T 2240/06* (2013.01)

(56) References Cited

FOREIGN PATENT DOCUMENTS

| | | |
|---|---|---|
| DE | 102004034067 | 2/2006 |
| DE | 102006031231 | 1/2008 |
| DE | 102011079134 | 1/2013 |
| DE | 102013217593 | 3/2015 |
| EP | 1388475 | 2/2004 |
| EP | 2777980 | 9/2014 |
| JP | 2000071963 | 3/2000 |
| JP | 2002264784 A | 9/2002 |
| JP | 2004042890 A | 2/2004 |
| JP | 2011088585 A | 5/2011 |
| JP | 2015089699 A | 5/2015 |
| WO | 2007144337 | 12/2007 |

\* cited by examiner

ND METHOD OF CONTROLLING
VEHICLE BODY BEHAVIOR CONTROL DEVICE AND METHOD OF CONTROLLING BEHAVIOR OF VEHICLE BODY

BACKGROUND OF THE INVENTION

The present invention relates to a vehicle body behavior control device and a method of controlling behavior of a vehicle body.

In a vehicle such as a motorcycle (two-wheeled vehicle or three-wheeled vehicle), a vehicle body behavior control device which controls behavior of a vehicle body is incorporated. For example, the vehicle body behavior control device controls an interlocking brake operation based on deceleration of the vehicle body (see JP-A-2000-71963).

SUMMARY OF THE INVENTION

In the conventional vehicle body behavior control device, even in a case where a condition of a road surface on which the vehicle body travels changes or the like, an interlocking brake operation is controlled based on deceleration of the vehicle body. Accordingly, for example, there may be a case where a braking force applied to each wheel becomes excessively large or small so that behavior of the vehicle body becomes unstable. Further, also in an ABS control and a traction control which do not accompany an interlocking brake operation, there is a case where behavior of a vehicle body becomes unstable due to a reason of a condition of a road surface not being taken into account.

The present invention has been made in view of the above-mentioned drawback, and it is an object of the present invention to provide a vehicle body behavior control device and a method of controlling behavior of a vehicle body which can reduce unstable behavior of the vehicle body.

According to the present invention, a vehicle body behavior control device is a vehicle body behavior control device which is incorporated into a vehicle body having a plurality of wheels, wherein the vehicle body behavior control device includes: a behavior control mechanism which is configured to control behavior of the vehicle body; and a control part which is configured to control an operation of the behavior control mechanism based on an axle load applied to the wheel calculated using a gradient value of a road surface.

According to the present invention, a method of controlling behavior of a vehicle body is a method of controlling behavior of a vehicle body having a plurality of wheels, wherein an operation of a behavior control mechanism which controls the behavior of the vehicle body is controlled based on an axle load applied to the wheel calculated using a gradient value of a road surface.

According to the vehicle body behavior control device and the method of controlling behavior of a vehicle body of the present invention, an operation of the behavior control mechanism is controlled based on an axle load applied to the wheel calculated using a gradient value of a road surface and hence, even in a case where a condition of the road surface changes or the like, it is possible to make the behavior of the vehicle body stable.

DETAILED DESCRIPTION

Hereinafter, a vehicle body behavior control device and a method of controlling behavior of a vehicle body according to the present invention are explained with reference to drawings.

Although the explanation will be made by taking a case as an example where the vehicle body behavior control device and the method of controlling behavior of a vehicle body according to the present invention are applied to a motorcycle, the vehicle body behavior control device and the method of controlling behavior of a vehicle body according to the present invention may be applied to other vehicles. For example, the vehicle body behavior control device and the method of controlling behavior of a vehicle body according to the present invention may be applied to a bicycle (including an electrically operated bicycle and a battery assisted bicycle) or the like.

Further, the constitutions, the operations and the like explained hereinafter form one example of the present invention, and the vehicle body behavior control device and the method of controlling behavior of a vehicle body according to the present invention are not limited to such constitutions, operations and the like.

Further, in the respective drawings, the illustration of detailed portions is simplified or omitted when necessary.

<Overall Constitution of Hydraulic Control System 100>

Figure 1:
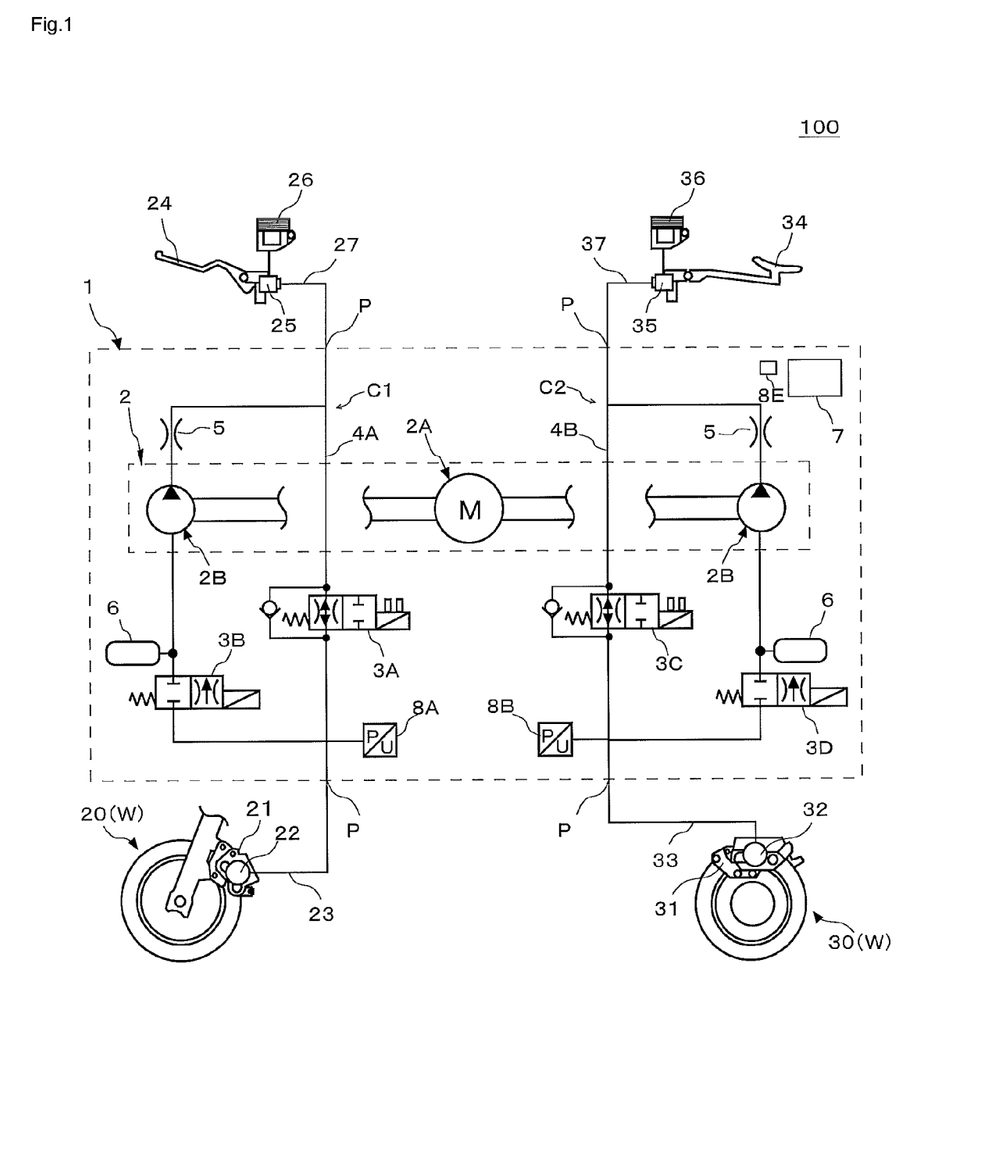
FIG. 1 is a schematic constitutional view of a hydraulic control system including a vehicle body behavior control device according to a first embodiment of the present invention.

FIG. 1 is a schematic constitutional view of a hydraulic control system 100 including a vehicle body behavior control device 1 according to a first embodiment of the present invention.

The hydraulic control system 100 is mounted on a motorcycle, and includes the vehicle body behavior control device 1 which controls behavior of a vehicle body.

The motorcycle has a vehicle body which includes a front wheel 20 and a rear wheel 30 (hereinafter also simply referred to as wheels W). An axle of the front wheel 20 and an axle of the rear wheel 30 are rotatably fixed to the vehicle body.

The motorcycle includes a handle lever 24 and a foot pedal 34 which a user or the like operates. A braking force applied to the front wheel 20 changes when the handle lever 24 is operated, and a braking force applied to the rear wheel 30 changes when the foot pedal 34 is operated. The handle lever 24 is operated by a driver's hand and the foot pedal 34 is operated by a driver's foot.

The hydraulic control system 100 includes a front wheel hydraulic circuit C1 through which a brake fluid used for generating a braking force applied to the front wheel 20 flows, and a rear wheel hydraulic circuit C2 through which a brake fluid used for generating a braking force applied to the rear wheel 30 flows.

The hydraulic control system 100 includes: a front brake pad 21 attached to the front wheel 20; a front wheel cylinder 22 in which a front brake piston (not shown in the drawing) which moves the front brake pad 21 is slidably disposed; and a brake fluid pipe 23 connected to the front wheel cylinder 22.

The hydraulic control system 100 includes: a first master cylinder 25 attached to the handle lever 24; a first reservoir 26 in which a brake fluid is stored; and a brake fluid pipe 27 connected to the first master cylinder 25. A master cylinder piston (not shown in the drawing) is slidably disposed in the first master cylinder 25. When the handle lever 24 is operated, the master cylinder piston in the first master cylinder 25 moves.

The hydraulic control system 100 includes: a rear brake pad 31 attached to the rear wheel 30; a rear wheel cylinder 32 in which a rear brake piston (not shown in the drawing) which moves the rear brake pad 31 is slidably disposed; and a brake fluid pipe 33 connected to the rear wheel cylinder 32.

The hydraulic control system 100 includes: a second master cylinder 35 attached to the foot pedal 34; a second reservoir 36 in which a brake fluid is stored; and a brake fluid pipe 37 connected to the second master cylinder 35. A master cylinder piston (not shown in the drawing) is slidably disposed in the second master cylinder 35. When the foot pedal 34 is operated, the master cylinder piston in the second master cylinder 35 moves.

<Constitutions of Respective Parts of Vehicle Body Behavior Control Device 1>

The vehicle body behavior control device 1 includes: an internal flow passage 4 through which a brake fluid flows; a pump device 2 used for transferring a brake fluid in the internal flow passage 4 toward a first master cylinder 25 side and a second master cylinder 35 side; and openable and closable regulating valves 3 mounted in the front wheel hydraulic circuit C1 and the rear wheel hydraulic circuit C2. The regulating valve 3 includes a first pressure boosting valve 3A and a first pressure reducing valve 3B, and a second pressure boosting valve 3C and a second pressure reducing valve 3D. The regulating valve 3 is an electromagnetic valve equipped with a solenoid, for example.

Here, a brake mechanism which forms a behavior control mechanism of the present invention corresponds to the regulating valves 3, the pump devices 2 and the like, for example, and a fluid pressure in the internal flow passage 4 is controlled by these mechanisms so that behavior of the vehicle body is controlled.

The vehicle body behavior control device 1 includes a control part 7 for controlling opening/closing of the regulating valves 3, a rotational speed of the pump device 2 or the like. A part or the whole of the control part 7 may be formed of a microcomputer, a micro processing unit or the like, for example. A part or the whole of the control part 7 may be also formed of a unit which can be updated such as a firmware. Further, a part or the whole of the control part 7 may be a program module or the like which is executed in accordance with an instruction from a CPU or the like.

The vehicle body behavior control device 1 includes a detection part 8 which outputs detection signals to the control part 7. The detection part 8 includes a first pressure sensor 8A and a second pressure sensor 8B mounted in the internal flow passage 4, a front wheel speed sensor 8C and a rear wheel speed sensor 8D used for calculating acceleration of the vehicle body (see FIG. 5); and an acceleration sensor 8E mounted on the vehicle body.

The vehicle body behavior control device 1 includes various kinds of ports P respectively connected to the brake fluid pipes 23, 27, 33, 37. The vehicle body behavior control device 1 includes flow restrictors 5 which restrict flow rates of brake fluids flowing through the internal flow passages 4; and accumulators 6 which can store a brake fluid therein.

In the explanation made hereinafter, a front wheel speed and a rear wheel speed may be also collectively referred to as a wheel speed, and the front wheel speed sensor 8C and the rear wheel speed sensor 8D may be also collectively referred to as a wheel speed sensor WS.

The internal flow passage 4 includes a first internal flow passage 4A which forms a part of the front wheel hydraulic circuit C1, and a second internal flow passage 4B which forms a part of the rear wheel hydraulic circuit C2.

The first pressure boosting valve 3A, the first pressure reducing valve 3B, the first pressure sensor 8A and the like are mounted in the first internal flow passage 4A. The first internal flow passage 4A is connected to the brake fluid pipe 23 and the brake fluid pipe 27 through the port P. The second pressure booster valve 3C, the second pressure reducing valve 3D, the second pressure sensor 8B and the like are mounted in the second internal flow passage 4B. The second internal flow passage 4B is connected to the brake fluid pipe 33 and the brake fluid pipe 37 through the port P.

The pump device 2 includes; for example, a drive mechanism 2A which can be formed of a DC motor or the like; and two pump elements 2B to which a drive force is given by the drive mechanism 2A. The drive mechanism 2A includes a stator, a rotor and the like, and a rotational speed of the drive mechanism 2A is controlled by the control part 7. One pump element 2B is used for transferring a brake fluid in the front wheel hydraulic circuit C1 and is mounted in the first internal flow passage 4A. The other pump element 2B is used for transferring a brake fluid in the rear wheel hydraulic circuit C2 and is mounted in the second internal flow passage 4B.

The control part 7 performs an interlocking brake operation for a vehicle body behavior control.

The interlocking brake operation is an operation for applying a braking force to both the front wheel 20 and the rear wheel 30 when an operation for applying a braking force to the front wheel 20 is performed by the handle lever 24 or when an operation for applying a braking force to the rear wheel 30 is performed by the foot pedal 34.

That is, the control part 7 performs, when the wheel W which forms a part of a plurality of wheels W connected to different operation systems is subject to braking in response to an operation by a user or the like in the operation system, an interlocking brake operation for applying a braking force to the wheel W and another wheel W connected to the operation system different from the above-mentioned operation system.

In this case, the control part 7 controls the interlocking brake operation based on an axle load applied to the wheel W calculated using a gradient value θ of a road surface. To be more specific, the control part 7 performs the interlocking brake operation by controlling opening/closing of the regulating valve 3 which constitutes a brake mechanism, a rotational speed of the pump device 2 or the like.

The control part 7 may calculate an axle load applied to the wheel W using a gradient value θ of a road surface or may calculate an axle load applied to the wheel W using other physical amount which can be converted into a gradient value θ of a road surface. Further, the control part 7 may perform the interlocking brake operation using an axle load applied to the wheel W or may perform the interlocking brake operation using other physical amount which can be converted into an axle load applied to the wheel W.

<Axle Load Applied to Front Wheel 20 and Axle Load Applied to Rear Wheel 30>

Figure 2:
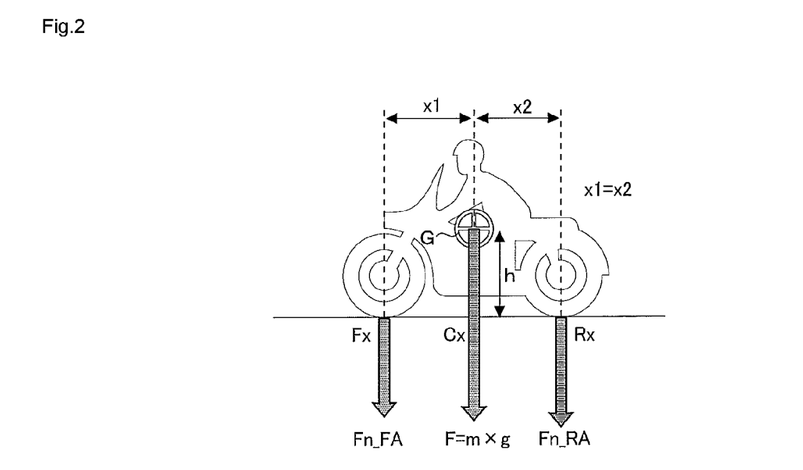
FIG. 2 is a view for explaining an axle load applied to a front wheel and an axle load applied to a rear wheel in a motorcycle which travels on a level ground.

FIG. 2 is a view for explaining an axle load applied to the front wheel 20 and an axle load applied to the rear wheel 30 in a motorcycle which travels on a level ground.

A mass m is a mass of the motorcycle. The center of gravity G is the center of gravity of the motorcycle. A height h is a height from a road surface to the center of gravity G. A position Cx is a position of the center of gravity G in a horizontal direction. A position Fx is a position of an axle of the front wheel 20 in the horizontal direction. A position Rx is a position of an axle of the rear wheel 30 in the horizontal direction. A load F is a load of the motorcycle which acts on the center of gravity G. A load Fn_FA is an axle load applied to the front wheel 20. A load Fn_RA is an axle load applied to the rear wheel 30. A component (mass, the center of gravity or the like) of a person riding on the motorcycle may be taken into account in setting the load Fn_FA and the load Fn_RA. Further, an acceleration component attributed to acceleration/deceleration of the motorcycle may be also taken into account in setting the load Fn_FA and the load Fn_RA.

A length x1 is a length between the position Cx and the position Fx. A length x2 is a length between the position Cx and the position Rx.

For the sake of convenience of explanation, assume that the motorcycle is designed such that a relationship (x1=x2) is established on a flat road surface. Firstly, a case is considered where the motorcycle is on a flat road surface as shown in FIG. 2.

Assuming gravitational acceleration as g, a load F expressed by m×g is applied to the motorcycle in a downward direction. The load F is divided into a component applied to the axle of the front wheel 20 and a component applied to the axle of the rear wheel 30. The load Fn_FA applied to the axle of the front wheel 20 and the load Fn_RA applied to the axle of the rear wheel 30 are expressed by the following formulae (1) and (2).

[Formula 1]

$$Fn\_FA = [1-\{x1/(x1+x2)\}] \times m \times g = m \times g/2 \quad (1)$$

[Formula 2]

$$Fn\_RA = [1-\{x2/(x1+x2)\}] \times m \times g = m \times g/2 \quad (2)$$

That is, on the flat road surface, the magnitude of the load Fn_FA and the magnitude of the load Fn_RA are equal.

Figure 3:
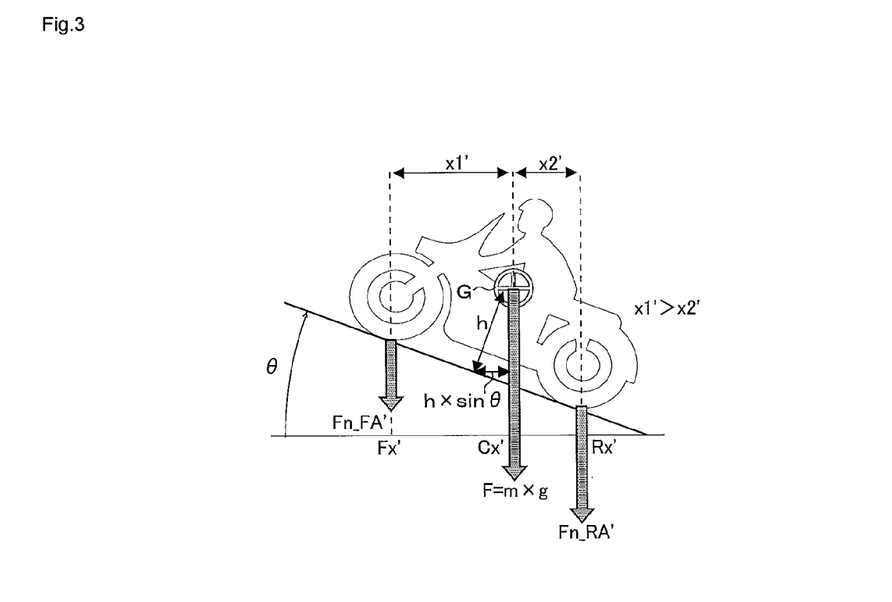
FIG. 3 is a view for explaining an axle load applied to the front wheel and an axle load applied to the rear wheel in the motorcycle which travels on a road surface having an uphill gradient.

FIG. 3 is a view for explaining an axle load applied to the front wheel 20 and an axle load applied to the rear wheel 30 in the motorcycle which travels on a road surface having an uphill gradient. Next, a case is considered where the motorcycle is on the road surface having an uphill gradient as shown in FIG. 3.

A gradient value θ of the road surface is an angle with reference to a horizontal plane, wherein a gradient value takes a positive value when a road surface has an uphill gradient and a gradient value takes a negative value when a road surface has a downhill gradient. A height h is a height of the center of gravity G in a direction orthogonal to the road surface having an uphill gradient. A position Cx' is a position of the center of gravity G in the horizontal direction. A position Fx' is a position of the axle of the front wheel 20 in the horizontal direction. A position Rx' is a position of the axle of the rear wheel 30 in the horizontal direction. A load Fn_FA' is an axle load applied to the front wheel 20. A load Fn_RA' is an axle load applied to the rear wheel 30.

A length x1' is a length between the position Cx' and the position Fx'. A length x2' is a length between the position Cx' and the position Rx'. The length x1' and the length x2' can be calculated as follows.

[Formula 3]

$$x1' = x1 \times \cos\theta + h \times \sin\theta \quad (3)$$

[Formula 4]

$$x2' = x2 \times \cos\theta - h \times \sin\theta \quad (4)$$

Accordingly, the load Fn_FA' applied to the axle of the front wheel 20 and the load Fn_RA' applied to the axle of the rear wheel 30 are expressed by the following formulae (5) and (6).

[Formula 5]

$$Fn\_FA' = [1-\{x1'/(x1'+x2')\}] \times m \times g = \\ [1-\{(x1 \times \cos\theta + h \times \sin\theta)/((x1+x2) \times \cos\theta)\}] \times m \times g \quad (5)$$

[Formula 6]

$$Fn\_RA' = [1-\{x2'/(x1'+x2')\}] \times m \times g = \\ [1-\{(x2 \times \cos\theta - h \times \sin\theta)/((x1+x2) \times \cos\theta)\}] \times m \times g \quad (6)$$

That is, when a relationship (x1=x2) is established, on a road surface having an uphill gradient, the load Fn_RA' becomes larger than the load Fn_FA'. Further, the larger a gradient value θ of a road surface (that is, the larger a value of an uphill gradient), the load Fn_RA' is increased and the load Fn_FA' is decreased.

Figure 4:
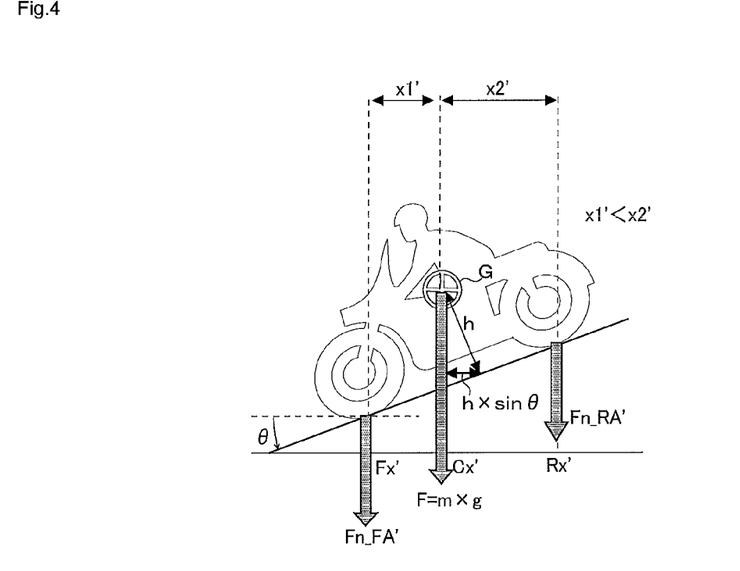
FIG. 4 is a view for explaining an axle load applied to the front wheel and an axle load applied to the rear wheel in the motorcycle which travels on a road surface having a downhill gradient.

FIG. 4 is a view for explaining an axle load applied to the front wheel 20 and an axle load applied to the rear wheel 30 in the motorcycle which travels on a road surface having a downhill gradient. The axle load applied to the front wheel 20 and the axle load applied to the rear wheel 30 in the motorcycle which travels on the road surface having a downhill gradient can be also calculated in a manner substantially equal to the manner explained with reference to FIG. 3.

That is, when a relationship (x1=x2) is established, on a road surface having an downhill gradient, the load Fn_FA' becomes larger than the load Fn_RA'. Further, the smaller a gradient value θ of a road surface (that is, the larger a value of a downhill gradient), the load Fn_FA' is increased and the load Fn_RA' is decreased.

By applying a larger braking force to the wheel W having the larger axle load than the wheel W having the small axle load, behavior of the vehicle body can be made stable. Further, as described previously, an axle load applied to each wheel W can be acquired from a gradient value θ of a road surface.

In the vehicle body behavior control device 1, a gradient value θ of a road surface is calculated, and an axle load applied to each wheel W is acquired using the gradient value θ of the road surface. Then, the vehicle body behavior control device 1 performs an interlocking brake operation based on the axle load thus making behavior of the vehicle body stable.

<Constitutional Example of Control Part 7>

Figure 5:
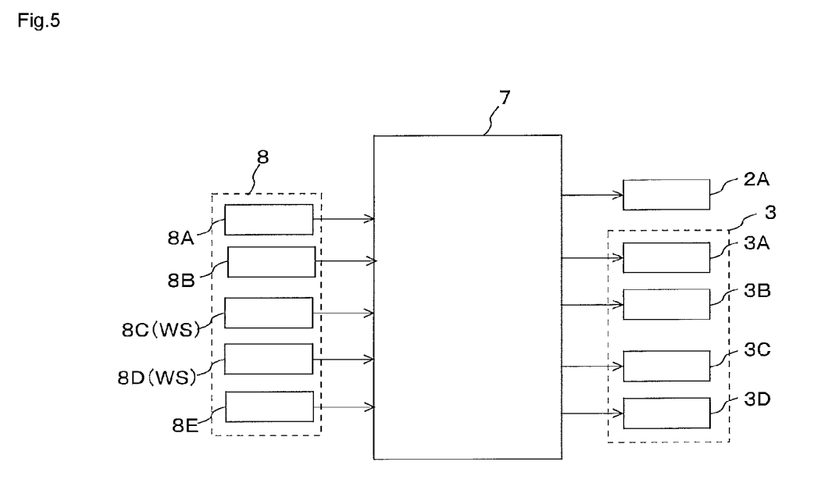
FIG. 5 is a functional block diagram of various sensors, a control part and various actuators which the hydraulic control system having the vehicle body behavior control device according to the first embodiment of the present invention includes.
Figure 6:
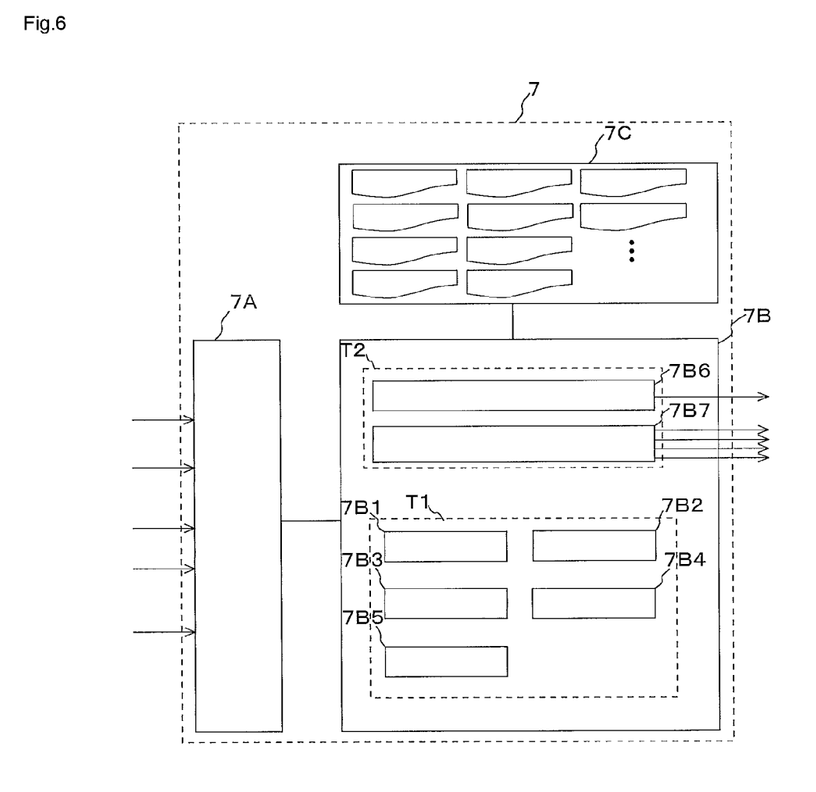
FIG. 6 is a functional block diagram of the control part included in the vehicle body behavior control device according to the first embodiment of the present invention.

FIG. 5 is a functional block diagram of various sensors, the control part 7 and various actuators which the hydraulic control system 100 having the vehicle body behavior control device 1 according to the first embodiment includes. FIG. 6 is a functional block diagram of the control part 7 included in the vehicle body behavior control device 1 according to the first embodiment. The constitutional example of the control part 7 is explained with reference to FIG. 5 and FIG. 6.

The control part 7 includes: an input part 7A which receives a signal from the detection part 8; a processor part 7B which calculates a gradient value θ of a road surface on which the vehicle body travels based on a signal from the detection part 8 and performs a control of opening/closing of the regulating valve 3, a rotational speed of the pump device 2 or the like; and a memory part 7C in which various data such as a calculated gradient value θ of a road surface, and an axle load applied to each wheel W are stored.

(Input Part 7A)

The input part 7A is formed of circuits including an input circuit which receives a signal from the detection part 8 and the like, for example. A signal which the input part 7A receives is outputted to the processor part 7B.

(Processor Part 7B)

The processor part 7B includes an arithmetic operation part T1 and an actuator control part T2. The arithmetic operation part T1 includes a vehicle body speed calculation part 7B1, a gradient calculation part 7B2, a determination part 7B3, an axle load calculation part 7B4 and a vehicle body behavior control execution part 7B5. The processor part 7B may be formed of a microcontroller or the like, for example.

The vehicle body speed calculation part 7B1 calculates a vehicle body speed vVeh based on a detection signal from the wheel speed sensor WS.

The gradient calculation part 7B2 calculates a gradient value θ of a road surface based on a detection signal from the acceleration sensor 8E and a detection signal from the wheel speed sensor WS. Here, an example of a method of calculating a gradient value θ of a road surface according to the first embodiment is explained.

An acceleration component aX in an advancing direction of the vehicle body acquired from a detection signal from the acceleration sensor 8E is regarded as a sum of an acceleration component aVeh attributed to acceleration/deceleration in the advancing direction of the vehicle body and an acceleration component aSlope attributed to a gradient value θ of a road surface. Accordingly, the control part 7 can estimate the acceleration component aSlope attributed to the gradient value θ of the road surface by performing the calculation of a formula (7). The acceleration component aVeh attributed to acceleration/deceleration can be obtained as a differential value of a wheel speed. For example, the control part 7 calculates a wheel speed based on a detection signal from the wheel speed sensor WS, and sets a calculated differential value of the wheel speed as the acceleration component aVeh attributed to acceleration/deceleration. The acceleration component aSlope attributed to the gradient value θ of the road surface takes a positive value when the motorcycle travels on a road surface having an uphill gradient, and takes a negative value when the motorcycle travels on a road surface having a downhill gradient.

[Formula 7]

$$a\text{Slope} = aX - a\text{Veh} \quad (7)$$

Then, the control part 7 can acquire a gradient value θ of a road surface by calculating a formula (8) using the acceleration component aSlope attributed to the gradient value θ of the road surface. The gradient value θ of the road surface takes a positive value when the motorcycle travels on a road surface having an uphill gradient, and takes a negative value when the motorcycle travels on a road surface having a downhill gradient.

[Formula 8]

$$\theta = \arcsin(a\text{Slope}/g) \quad (8)$$

In this manner, the gradient calculation part 7B2 can calculate a gradient value θ of a road surface on which the motorcycle is traveling based on a detection signal from the acceleration sensor 8E and a detection signal from the wheel speed sensor WS.

The method of calculating a gradient value θ of a road surface performed by the control part 7 is not limited to the above-mentioned method. For example, the vehicle body behavior control device 1 may include a gradient sensor additionally besides the acceleration sensor 8E, and the control part 7 may acquire a gradient value θ of a road surface from a detection signal from the gradient sensor. In such a case, a load of the control part 7 can be reduced by an amount that the above-mentioned calculation of the gradient calculation part 7B2 becomes unnecessary.

Further, for example, the control part 7 may acquire information on a gradient value θ of a road surface on which the motorcycle is traveling based on GPS information. Also in such a case, a load of the control part 7 can be reduced by an amount that the above-mentioned calculation of the gradient calculation part 7B2 becomes unnecessary.

The determination part 7B3 determines whether a road surface on which the motorcycle is traveling has an uphill gradient, a downhill gradient or is flat based on a gradient value θ of a road surface calculated by the gradient calculation part 7B2. These determinations of the determination part 7B3 are used in a braking force distribution flow described later.

The axle load calculation part 7B4 calculates an axle load applied to each wheel W using a gradient value θ of a road surface calculated by the gradient calculation part 7B2. An axle load applied to each wheel W can be calculated by taking into account the previously mentioned formulae (1) to (6).

The vehicle body behavior control execution part 7B5 generates a control signal for performing an interlocking brake operation which constitutes a vehicle body behavior control based on the axle load applied to each wheel W calculated by the axle load calculation part 7B4, and outputs the control signal to the actuator control part T2.

Axle loads applied to the respective wheels W change corresponding to a gradient value θ of a road surface. Accordingly, the vehicle body behavior control execution part 7B5 performs a braking force distribution flow described later so as to change a ratio of braking forces applied to the respective wheels W corresponding to the axle load applied to each wheel W thus reducing unstable behavior of the motorcycle.

The actuator control part T2 includes a drive mechanism control part 7B6 and a valve control part 7B7.

At the time of performing an interlocking brake operation, the valve control part 7B7 controls an opening/closing operation of the regulating valve 3, and the drive mechanism control part 7B6 controls a rotational speed of the drive mechanism 2A cooperatively with the valve control part 7B7.

(Memory Part 7C)

In the memory part 7C, information on wheel speeds of the front wheel 20 and the rear wheel 30, information calculated by the processor part 7B, reference values and the like are stored. The memory part 7C may be formed of a RAM (Random Access Memory) or the like, for example.

<Braking Force Distribution in Interlocking Brake Operation>

Figure 7:
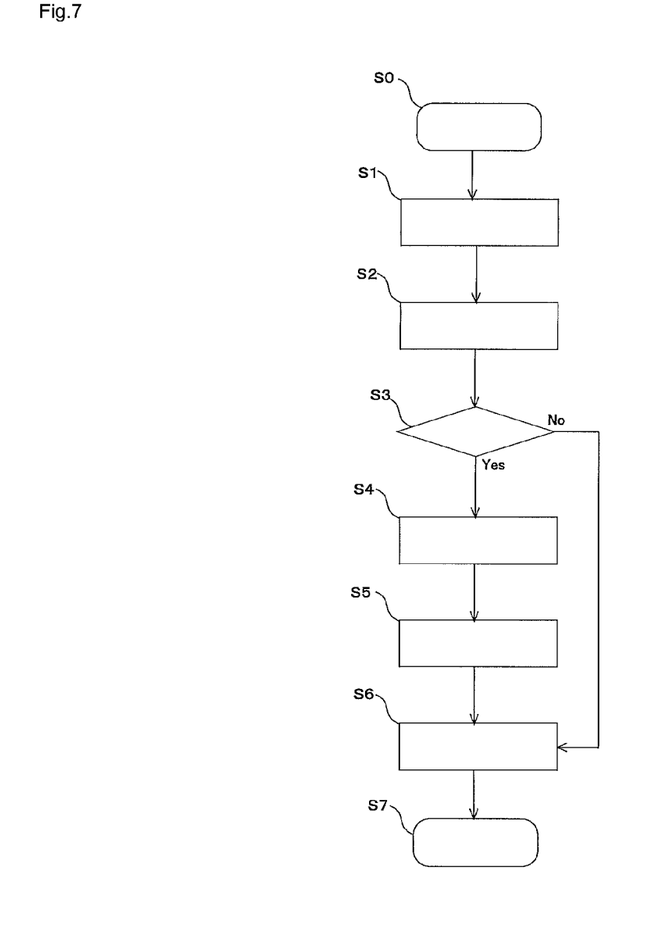
FIG. 7 is a view showing one example of the flow of braking force distribution of the front wheel and the rear wheel performed by the vehicle body behavior control device according to the first embodiment of the present invention.

FIG. 7 is a view showing one example of the flow of braking force distribution of the front wheel 20 and the rear wheel 30 executed by the vehicle body behavior control device 1 according to the first embodiment.

(Step S0: Start)

The control part 7 starts a braking force distribution flow.

(Step S1: Acquisition of Reference Values for Braking Forces)

The vehicle body behavior control execution part 7B5 of the control part 7 sets reference values for braking forces distributed to the front wheel 20 and the rear wheel 30 using a vehicle body speed vVeh calculated by the vehicle body speed calculation part 7B1, for example. The reference values for the braking forces distributed to the front wheel 20 and the rear wheel 30 may be constantly calculated or may be stored in the memory part 7C in advance.

(Step S2: Calculation of Gradient Value θ of Road Surface)

The gradient calculation part 7B2 of the control part 7 calculates a gradient value θ of a road surface on which the vehicle body is traveling based on a detection signal from the acceleration sensor 8E and a detection signal from the wheel speed sensor WS.

(Step S3: Determination Relating to Gradient of Road Surface)

The determination part 7B3 of the control part 7 determines whether or not a road surface has an uphill gradient or a downhill gradient or is flat based on a gradient value θ of a road surface calculated by the gradient calculation part 7B2.

When the road surface has an uphill gradient or a downhill gradient, processing advances to step S4.

When the road surface is flat, processing advances to step S5.

(Step S4: Calculation of Axle Load Applied to Each Wheel W)

In the control part 7, when the determination part 7B3 determines that a road surface has an uphill gradient or a downhill gradient, the axle load calculation part 7B4 calculates an axle load applied to each wheel W based on a gradient value θ of a road surface calculated by the gradient calculation part 7B2.

(Step S5: Correction of Braking Force Distribution)

The vehicle body behavior control execution part 7B5 of the control part 7 corrects numerical values of a braking force of the front wheel 20 and a braking force of the rear wheel 30 set in step S1 based on the axle load applied to each wheel W calculated by the axle load calculation part 7B4.

For example, in a state where a road surface has an uphill gradient, the vehicle body behavior control execution part 7B5 executes a control such that the larger an axle load applied to the rear wheel 30 (the larger a gradient value θ of a road surface), the larger a ratio of a braking force distributed to the rear wheel 30 becomes. On the other hand, in a state where a road surface has a downhill gradient, the vehicle body behavior control execution part 7B5 executes a control such that the larger an axle load applied to the front wheel 20 (the smaller a gradient value θ of a road surface), the larger a ratio of a braking force distributed to the front wheel 20 becomes. In increasing a ratio of a braking force distributed to the front wheel 20, the vehicle body behavior control execution part 7B5 may preferably increase a ratio of a braking force distributed to the front wheel 20 without lowering a braking force applied to the rear wheel 30.

(Step S6: Setting Braking Force Distribution)

When the processing is subject to step S3, the control part 7 uses reference values for braking forces applied to the front wheel 20 and the rear wheel 30 which are set in step S1 as set values for braking force distribution.

On the other hand, when the processing is subject to step S5, the control part 7 uses numerical values of braking forces applied to the front wheel 20 and the rear wheel 30 corrected in step S5 as set values for braking force distribution.

(Step S7: End)

The control part 7 finishes the braking force distribution flow.

<Advantageous Effects Acquired by Vehicle Body Behavior Control Device 1 According to First Embodiment>

The vehicle body behavior control device 1 according to the first embodiment includes: the behavior control mechanism which controls behavior of the vehicle body; and the control part 7 which controls an operation of the behavior control mechanism based on an axle load applied to the wheel W calculated using a gradient value θ of a road surface. Accordingly, even when a gradient of a road surface changes, it is possible to reduce unstable behavior of the vehicle body.

It is preferable that the behavior control mechanism of the vehicle body behavior control device 1 according to the first embodiment be a brake mechanism, and the control part 7 controls an operation of applying braking to the wheel W performed by the brake mechanism as an operation of the behavior control mechanism. The operation of applying braking to the wheel W is an interlocking brake operation which applies braking forces to the plurality of wheels W when an operation of applying braking to any one of these wheels W is performed by way of the handle lever 24 or the foot pedal 34. In this manner, the vehicle body behavior control device 1 performs an interlocking brake operation for applying braking to the wheel W by taking into account an axle load and hence, effectiveness of the interlocking brake operation can be enhanced.

It is preferable that the control part 7 of the vehicle body behavior control device 1 according to the first embodiment change a ratio of braking forces distributed to the plurality of wheels W respectively in the interlocking brake operation based on the axle load applied to the wheel W.

For example, the control part 7 of the vehicle body behavior control device 1 according to the first embodiment executes a control such that the larger the axle load applied to the rear wheel 30 (the larger the gradient value θ of the road surface), the larger a ratio of the braking force distributed to the rear wheel 30 becomes in a state where the road surface has an uphill gradient. The larger a gradient of a road surface having an uphill gradient (the larger a gradient value θ of a road surface), the larger an axle load applied to the rear wheel 30 becomes. In view of the above, by further increasing a braking force applied to the rear wheel 30, it is possible to reduce unstable behavior of the motorcycle with more certainty.

For example, the control part 7 of the vehicle body behavior control device 1 according to the first embodiment executes a control such that the larger the axle load applied to the front wheel 20 (the smaller the gradient value θ of the road surface), the larger a ratio of the braking force distributed to the front wheel 20 becomes in a state where the road surface has a downhill gradient. The larger a gradient of a road surface having a downhill gradient (the smaller a gradient value θ of a road surface), the larger an axle load applied to the front wheel 20 becomes. In view of the above, by further increasing a braking force applied to the front wheel 20, it is possible to reduce unstable behavior of the motorcycle with more certainty.

For example, the control part 7 of the vehicle body behavior control device 1 according to the first embodiment increases a ratio of a braking force distributed to the front wheel 20 without lowering a braking force applied to the rear wheel 30 in a state where a road surface has a downhill gradient. When the motorcycle travels on a road surface having a downhill gradient, the motorcycle's own weight acts so as to increase a speed of the motorcycle and hence, a sum of required braking forces becomes large compared to the case where the motorcycle travels on a road surface having an uphill gradient or a flat road surface. Accordingly, in an interlocking brake operation performed when a road surface has a downhill gradient, the control part 7 increases a ratio of a braking force distributed to the front wheel 20 without lowering a braking force applied to the rear wheel 30 thus suppressing the occurrence of shortage of the braking force.

Second Embodiment

Hereinafter, a vehicle body behavior control device 1 of a second embodiment is explained. However, the explanation for constitutional elements of the vehicle body behavior control device 1 which overlap with the corresponding constitutional elements of the vehicle body behavior control device 1 of the first embodiment is omitted, and only constitutional elements which make the second embodiment differ from the first embodiment are explained.
<Constitutions of Respective Parts of Vehicle Body Behavior Control Device 1>

The control part 7 determines whether or not the respective wheels W have lifted off the road surface based on axle loads applied to the respective wheels W. Then, the control part 7 uses a result of the determination in a vehicle body behavior control such as an ABS control or a traction control, for example.

Here, the ABS control is a control where locking of the wheel W is suppressed during deceleration of the motorcycle. The control part 7 determines whether or not the wheel W has lifted off the road surface based on an axle load applied to the wheel W calculated using a gradient value θ of a road surface, and uses a result of the determination in the ABS control.

The traction control is a control where idling of the wheel W is suppressed during traveling of the motorcycle. The control part 7 determines whether or not the wheel W has lifted off the road surface based on an axle load applied to the wheel W calculated using a gradient value θ of a road surface, and uses a result of the determination in the traction control.

For example, assume a situation where a brake operation is performed when the motorcycle is traveling on a road surface having a downhill gradient and the wheel W is likely to be locked. With such a motorcycle which is traveling on a road surface having a downhill gradient, an axle load applied to the front wheel 20 is increased and the rear wheel 30 is likely to lift off. Under such a situation, the control part 7 determines whether or not the rear wheel 30 lifts off based on an axle load applied to the wheel W. The control part 7 may determine whether or not the rear wheel 30 has lifted off the road surface using only the axle load applied to the rear wheel 30 or may determine whether or not the rear wheel 30 has lifted off the road surface using a slip ratio of the rear wheel 30 calculated from a wheel speed and a vehicle body speed vVeh and an axle load applied to the rear wheel 30. The control part 7 may use an axle load applied to the rear wheel 30 or may use other physical amount which can be converted into the axle load applied to the rear wheel 30 (for example, an axle load applied to the front wheel 20 or the like).

Assume the case where the control part 7 determines whether or not the rear wheel 30 has lifted off the road surface using only a slip ratio of the rear wheel 30 calculated from a wheel speed and a vehicle body speed vVeh. In this case, a phenomenon where the rear wheel 30 is likely to lift off due to a downhill gradient is not taken into account and hence, the determination of whether or not the rear wheel 30 has lifted off the road surface becomes incorrect whereby effectiveness of an ABS control is reduced. On the other hand, in the case where the control part 7 determines whether or not the rear wheel 30 has lifted off the road surface based on an axle load applied to the wheel W, a phenomenon where the rear wheel 30 is likely to lift off due to a downhill gradient is taken into account and hence, the determination of whether or not the rear wheel 30 has lifted off the road surface can be performed correctly whereby effectiveness of an ABS control is enhanced.

In this case, the explanation has been made with respect to an ABS control executed when the motorcycle travels on a road surface having a downhill gradient. However, also in an ABS control executed when the motorcycle travels on a road surface having an uphill gradient, the determination whether or not the wheel W has lifted off the road surface can be performed correctly using an axle load applied to the wheel W. Accordingly, effectiveness of an ABS control is further enhanced when the motorcycle travels on a road surface having a downhill gradient.

For example, assume a situation where the motorcycle is accelerated when the motorcycle is traveling on a road surface having an uphill gradient so that the wheel W is about to start idling. With such a motorcycle which is traveling on the road surface having an uphill gradient, an axle load applied to the rear wheel 30 is increased and the front wheel 20 is likely to lift off. Under such a situation, the control part 7 determines whether or not the front wheel 20 has lifted off the road surface based on an axle load applied to the wheel W. The control part 7 may determine whether or not the front wheel 20 has lifted off from the road surface using only the axle load applied to the front wheel 20 or may determine whether or not the front wheel 20 has lifted off the road surface using a slip ratio of the front wheel 20 calculated from a wheel speed and a vehicle body speed vVeh and an axle load applied to the front wheel 20. The control part 7 may use an axle load applied to the front wheel 20 or may use other physical amount which can be converted into the axle load applied to the front wheel 20 (for example, an axle load applied to the rear wheel 30 or the like).

Assume the case where the control part 7 determines whether or not the front wheel 20 has lifted off the road surface using only a slip ratio of the front wheel 20 calculated from a wheel speed and a vehicle body speed vVeh. In this case, a phenomenon where the front wheel 20 is likely to lift off due to an uphill gradient is not taken into account and hence, the determination whether or not the front wheel 20 has lifted off the road surface becomes incorrect whereby effectiveness of a traction control is reduced. On the other hand, as described above, in the case where the control part 7 determines whether or not the front wheel 20 has lifted off the road surface based on an axle load applied to the wheel W, a phenomenon where the front wheel 20 is likely to lift off due to an uphill gradient is taken into account and hence, the determination whether or not the front wheel 20 has lifted off the road surface can be performed correctly whereby effectiveness of a traction control is enhanced.

With respect to the above traction control, the explanation has been made with respect to a traction control which is executed when the motorcycle travels on a road surface having an uphill gradient. However, also in a traction control executed when the motorcycle travels on a road surface having a downhill gradient, the determination whether or not the wheel W has lifted off the road surface can be performed correctly using an axle load applied to the wheel W. Accordingly, effectiveness of a traction control is further enhanced when the motorcycle travels on a road surface having an uphill gradient.

<Advantageous Effect Acquired by Vehicle Body Behavior Control Device 1 According to Second Embodiment>

The control part 7 of the vehicle body behavior control device 1 according to the second embodiment detects whether or not the wheel W has lifted off the road surface based on an axle load applied to the wheel W. Accordingly, the determination whether or not the wheel W has lifted off the road surface can be performed correctly and hence, it is possible to reduce unstable behavior of the vehicle body.

Although the explanation has been made with respect to the first embodiment and the second embodiment, the present invention is not limited to the respective embodiments. For example, the respective embodiments may be combined with each other wholly or partially.

REFERENCE SIGNS LIST

1: vehicle body behavior control device
2: pump device
2A: drive mechanism
2B: pump element
3: regulating valve
3A: first pressure boosting valve
3B: first pressure reducing valve
3C: second pressure boosting valve
3D: second pressure reducing valve
4: internal flow passage
4A: first internal flow passage
4B: second internal flow passage
5: flow restrictor
6: accumulator
7: control part
7A: input part
7B: processor part
7B1: vehicle body speed calculation part
7B2: gradient calculation part
7B3: determination part
7B4: axle load calculation part
7B5: vehicle body behavior control execution part
7B6: drive mechanism control part
7B7: valve control part
7C: memory part
8: detection part
8A: first pressure sensor
8B: second pressure sensor
8C: front wheel speed sensor
8D: rear wheel speed sensor
8E: acceleration sensor
20: front wheel
21: front brake pad
22: front wheel cylinder
23: brake fluid pipe
24: handle lever
25: first master cylinder
26: first reservoir
27: brake fluid pipe
30: rear wheel
31: rear brake pad
32: rear wheel cylinder
33: brake fluid pipe
34: foot pedal
35: second master cylinder
36: second reservoir
37: brake fluid pipe
100: hydraulic control system
C1: front wheel hydraulic circuit
C2: rear wheel hydraulic circuit
G: center of gravity
P: port
T1: arithmetic operation part
T2: actuator control part
W: wheel
WS: wheel speed sensor

The invention claimed is:

1. A vehicle body behavior control device configured to be incorporated into a vehicle body having a plurality of wheels, the vehicle body behavior control device comprising:
a behavior control mechanism which is configured to control behavior of the vehicle body; and
a control part which is configured to control an operation of the behavior control mechanism based on an axle load applied to the wheel calculated using a gradient value of a road surface,
wherein the control part is configured to detect whether or not the wheel has lifted off the road surface based on the axle load applied to the wheel.

2. The vehicle body behavior control device according to claim 1, wherein the behavior control mechanism is a brake mechanism, and the control part is configured to control an operation of applying braking to the wheel performed by the brake mechanism as an operation of the behavior control mechanism.

3. The vehicle body behavior control device according to claim 2, wherein the operation of applying braking to the wheel is an interlocking brake operation which applies a braking force to the two or three wheels when an operation of applying braking to any one of the wheels is performed.

4. The vehicle body behavior control device according to claim 3, wherein the control part is configured to change ratios of the braking forces distributed to the two or three wheels including at least one front wheel and at least one rear wheel in the interlocking brake operation based on the axle load applied to the wheels.

5. The vehicle body behavior control device according to claim 4, wherein the control part is configured to execute a control where the larger the axle load applied to the rear wheel, the larger a ratio of the braking force distributed to the rear wheel becomes in a state where the road surface has an uphill gradient.

6. The vehicle body behavior control device according to claim 4, wherein the control part is configured to execute a control where the larger the axle load applied to the front wheel, the larger a ratio of the braking force distributed to the front wheel becomes in a state where the road surface has a downhill gradient.

7. The vehicle body behavior control device according to claim 6, wherein the control part is configured to increase the ratio of the braking force distributed to the front wheel without lowering the braking force applied to the rear wheel in a state where the road surface has a downhill gradient.

8. A vehicle comprising a vehicle body having a plurality of wheels, and a vehicle body behavior control device which is incorporated into the vehicle body, the vehicle body behavior control device comprising:
a behavior control mechanism which is configured to control behavior of the vehicle body; and
a control part which is configured to control an operation of the behavior control mechanism based on an axle load applied to the wheel calculated using a gradient value of a road surface,
wherein the control part is configured to detect whether or not the wheel has lifted off the road surface based on the axle load applied to the wheel.

9. The vehicle according to claim 8, wherein the behavior control mechanism is a brake mechanism, and the control part is configured to control an operation of applying braking to the wheel performed by the brake mechanism as an operation of the behavior control mechanism.

10. The vehicle according to claim 9, wherein the operation of applying braking to the wheel is an interlocking brake operation which applies a braking force to the two or three wheels when an operation of applying braking to any one of the wheels is performed.

11. The vehicle according to claim 10, wherein the control part is configured to change ratios of the braking forces distributed to the two or three wheels including at least one front wheel and at least one rear wheel in the interlocking brake operation based on the axle load applied to the wheels.

12. The vehicle according to claim 11, wherein the control part is configured to execute a control where the larger the axle load applied to the rear wheel, the larger a ratio of the braking force distributed to the rear wheel becomes in a state where the road surface has an uphill gradient.

13. The vehicle according to claim 11, wherein the control part is configured to execute a control where the larger the axle load applied to the front wheel, the larger a ratio of the braking force distributed to the front wheel becomes in a state where the road surface has a downhill gradient.

14. The vehicle according to claim 11, wherein the control part is configured to increase the ratio of the braking force distributed to the front wheel without lowering the braking force applied to the rear wheel in a state where the road surface has a downhill gradient. or not the wheel has lifted off the road surface based on the axle load applied to the wheel.

15. The vehicle according to claim 11, wherein the vehicle is a motorcycle.

16. The vehicle according to claim 10, wherein the vehicle includes a hand lever and a foot pedal for applying braking to the wheels.

17. The vehicle according to claim 8, wherein the vehicle is a motorcycle.

* * * * *